US010511539B2

(12) United States Patent
Mehr et al.

(10) Patent No.: US 10,511,539 B2
(45) Date of Patent: *Dec. 17, 2019

(54) SYSTEM AND METHOD FOR LOCATING DESIRED TRAITS IN RESOURCES USING A NETWORK

(71) Applicant: Zoosk, Inc., San Francisco, CA (US)

(72) Inventors: Alexander F. Mehr, San Francisco, CA (US); Shayan G. Zadeh, San Francisco, CA (US)

(73) Assignee: Zoosk, Inc., San Francisco, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 15/289,193

(22) Filed: Oct. 9, 2016

(65) Prior Publication Data

US 2017/0048162 A1     Feb. 16, 2017

Related U.S. Application Data

(63) Continuation of application No. 13/136,775, filed on Aug. 10, 2011, now Pat. No. 9,466,064.

(60) Provisional application No. 61/401,234, filed on Aug. 10, 2010.

(51) Int. Cl.
    *H04L 12/00*     (2006.01)
    *H04L 12/911*     (2013.01)
    *G06Q 30/02*     (2012.01)
    *G06Q 30/06*     (2012.01)
    *H04L 29/08*     (2006.01)

(52) U.S. Cl.
CPC ........... *H04L 47/783* (2013.01); *G06Q 30/02* (2013.01); *G06Q 30/0623* (2013.01); *G06Q 30/0627* (2013.01); *G06Q 30/0629* (2013.01); *G06Q 30/0631* (2013.01); *H04L 67/306* (2013.01)

(58) Field of Classification Search
CPC ............... G06Q 30/02; G06Q 30/0623; G06Q 30/0629; G06Q 30/0631
USPC ............... 709/201, 203, 204, 205, 217–219, 709/225–226; 705/14.25, 14.53, 14.54; 707/769, 748, 758
See application file for complete search history.

(56) References Cited

U.S. PATENT DOCUMENTS

| | | | | |
|---|---|---|---|---|
| 7,502,748 | B1 * | 3/2009 | Baldwin | G06Q 10/06 705/7.14 |
| 8,295,851 | B2 * | 10/2012 | Finnegan | H04W 4/21 455/456.1 |
| 8,837,687 | B2 * | 9/2014 | Odinak | H04M 3/5175 379/88.01 |
| 9,466,064 | B2 * | 10/2016 | Mehr | G06Q 30/02 |
| 2002/0103792 | A1 * | 8/2002 | Blank | G06F 16/24578 |
| 2007/0073710 | A1 * | 3/2007 | Terrill | G06F 17/30572 |
| 2009/0037521 | A1 * | 2/2009 | Zilca | G06F 16/9535 709/203 |
| 2010/0287032 | A1 * | 11/2010 | Wallace | G06Q 30/0201 705/7.29 |
| 2011/0035674 | A1 * | 2/2011 | Chenoweth | G06F 16/2457 715/745 |
| 2013/0108997 | A1 * | 5/2013 | Wright | G06Q 30/0203 434/236 |

(Continued)

*Primary Examiner* — Frantz Coby
(74) *Attorney, Agent, or Firm* — Innovation Partners; Charles E. Gotlieb

(57) ABSTRACT

A system and method updates a consumer's preference information not only as a result of explicit preference information received from the consumer, but also resulting from actions of the user.

21 Claims, 6 Drawing Sheets

(56) References Cited

U.S. PATENT DOCUMENTS

2016/0357536 A1\* 12/2016 Firlik ..................... G06F 9/54

\* cited by examiner

YOUR MATCH TODAY
JANE JOHNSON — 510

AGE: 34
HAIR: MEDIUM LENGTH, BLACK
HEIGHT: 5'6" — 512
WEIGHT: 140
INTERESTS: SKYDIVING, RACE CAR DRIVING, SKEET SHOOTING

508

LAST LOGIN: 1 HOUR AGO, 57 VIEWS
— 514

SHE FITS YOUR:
HEIGHT
WEIGHT
HAIR — 516
REQUIREMENTS

YOU FIT HER:
HEIGHT
AGE
HAIR — 518
REQUIREMENTS

*FIG. 5*

1:37:05
REMAINING — 520

416

528

522
MIGHT BE INTERESTED:
SEE MORE ABOUT YOUR MATCH

524
INTERESTED:
CONTACT YOUR MATCH

526
INTERESTED:
SET UP A DATE WITH YOUR MATCH

NOT INTERESTED:
RECYCLE YOUR MATCH

HELP US MAKE BETTER MATCHES FOR YOU

WHAT DID YOU LIKE ABOUT TODAY'S MATCH

WHAT DID YOU NOT LIKE ABOUT TODAY'S MATCH

530

532

SUBMIT

SYSTEM AND METHOD FOR LOCATING DESIRED TRAITS IN RESOURCES USING A NETWORK

RELATED APPLICATION

This application is a continuation in part of U.S. patent application Ser. No. 13/136,775, entitled "System and Method for Locating Desired Traits in Resources Using a Network", filed by Alex Mehr Shayan Zadeh on Aug. 10, 2011, which claims the benefit of U.S. Provisional Patent Application Ser. No. 61/401,234 entitled "method and Apparatus for Locating Desired Traits in Resources Using a Network" filed by Alex F. Mehr and Shayan G. Zadeh on Aug. 10, 2010, each having the same assignee as the present invention and is hereby incorporated by reference in its entirety.

FIELD OF THE INVENTION

The present invention is related to computer hardware and software and more specifically to identifying and matching desired traits with resources that can provide such traits.

BACKGROUND OF THE INVENTION

Consumers of resources can select the resource based on the value of certain traits the resource possesses. For example, a racehorse may be selected based on its speed. Some consumers select resources based on the value of multiple traits, with the consumers trading off one trait with another based on the importance, or weight, the consumer assigns to that trait. Thus, a racehorse may not only be selected based on its speed, but also on its overall bone structure. A fast racehorse with brittle bones is not as valuable to a consumer interested in long term ownership as a slightly slower racehorse with stronger bones.

When a consumer starts the resource selection process, the consumer may not know all of the traits that the consumer will ultimately find important. Thus, initially, a consumer may simply look for the fastest racehorse, but over time, may learn that bone structure is a trait that they would like to consider.

The consumer may also assign a weight to each trait, but consumers are not always forthcoming in the weight assigned to each trait. The consumer may decide that bone structure is the most important trait, and speed is the second most important trait. However, when the consumer ultimately selects the horse, he may discover that speed is actually equally important to bone structure.

A consumer may initially determine that only certain values of traits are acceptable, but consumers can change their minds regarding such values. For example, the consumer may initially decide that a certain price for the horse is his or her maximum. However, presented with a very fast horse with excellent bone structure, the consumer may elect to spend more than their stated maximum.

In addition, the consumer may not realize that the consumer finds certain traits to be important. A consumer may find that consumer gravitating towards taller horses, when the height of the horse is not even on the list of traits the consumer believes are important to that consumer.

There are different methods that can be used for selecting a resource using a network. For example, a consumer at the consumer system may request a server to provide a list of all of the available resources subject to an initial selection criteria. The consumer can then sift through the profiles returned and select the most promising resources. This method may not work well when there are many resources, or if the consumers do not wish to be so actively involved in locating them.

Passive consumers might prefer having a far smaller, targeted set of resources provided to them based on a matching algorithm that uses their answers to a battery of questions. However, as noted above, the consumers may not be aware of things that are important to them, may not be cognizant of the weights and values of the characteristics they prefer, and may not want to answer the lengthy battery of questions that can be required to provide a truly targeted match.

What is needed is a system and method that can identify a more targeted group of resources than is available using a search, that can match the resources to the consumer's preferences, without requiring the consumers to answer a lengthy battery of questions, and can learn the consumer's preferences to provide better targeting of the available resources to the consumer's preferences, even those preferences the consumer may not realize they had.

SUMMARY OF INVENTION

A system and method receives a limited amount of initial preference information from a consumer of resources, and attempts to match one of the resources to the consumer and the consumer views the resource and information about the resource and provides the system and method a positive or negative indication of interest in the resource as well as the reason why the consumer is or is not interested in the matched resource. The preferences of the consumer are then updated or refined based on such information. The system and method additionally watches other activity the user performs with respect to matched resources as well as the other available resources and updates or refines the user's preferences based on such activity.

To match the consumer with one of the available resources, the preferences of the user are considered against the characteristics of the available resources. In addition, the interest and activity of consumers with similar preferences of a consumer may be used to match a resource that consumers with similar preferences found desirable.

Different resources matched to each consumer may be presented to the consumer during each of several periods, such as every day. When displaying a resource matched to a consumer, the resource and information about the resource may be displayed along with a countdown clock indicating how much longer the resource match will be applicable to that user. If the user indicates an interest in that resource before the end of the period indicated by the clock, information that can be useful in allowing the consumer to connect with the resource is provided to that consumer. In one embodiment, consumers also possess resources or are resources themselves and vice versa, and in such embodiment, the indication of interest must be mutual before the consumers are provided with information that will allow them to connect with one another.

BRIEF DESCRIPTION OF THE DRAWINGS

FIG. 5 is a representative display of a potential mutual match according to one embodiment of the present invention.

DETAILED DESCRIPTION OF A PREFERRED EMBODIMENT

Figure 1:
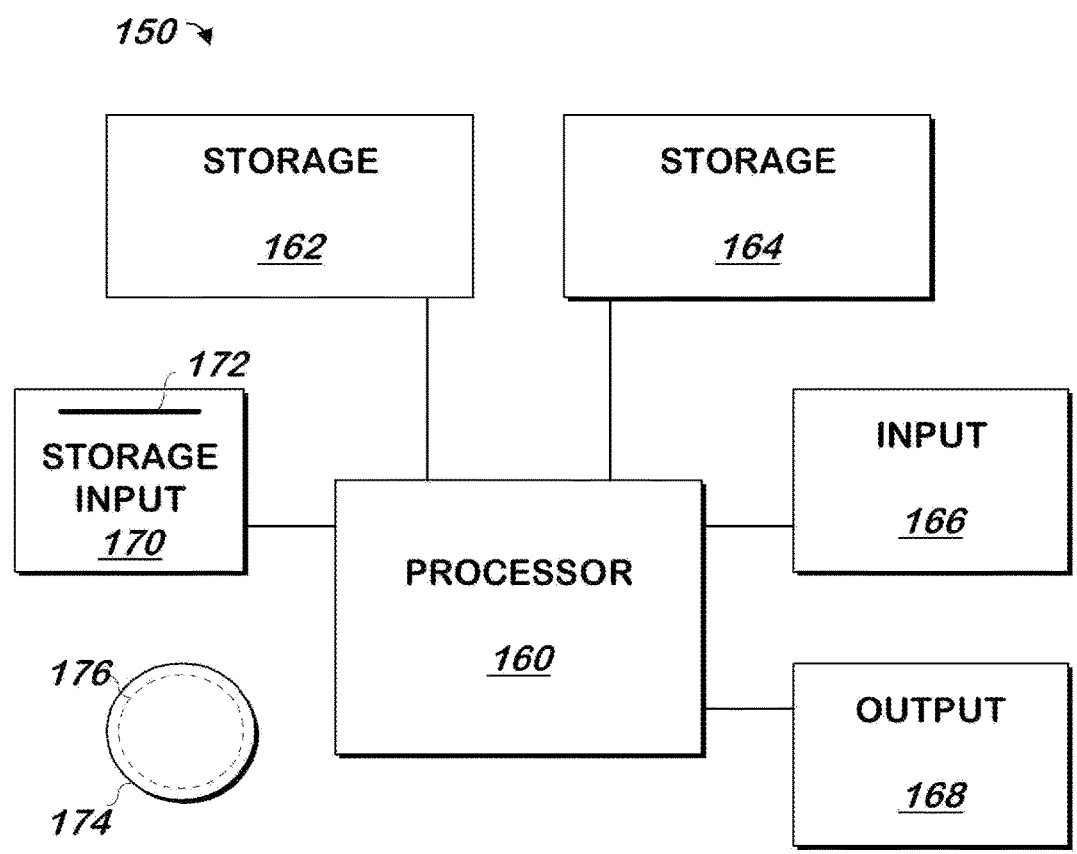
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as XP, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the MOZILLA browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

User Registration.

Figure 2:
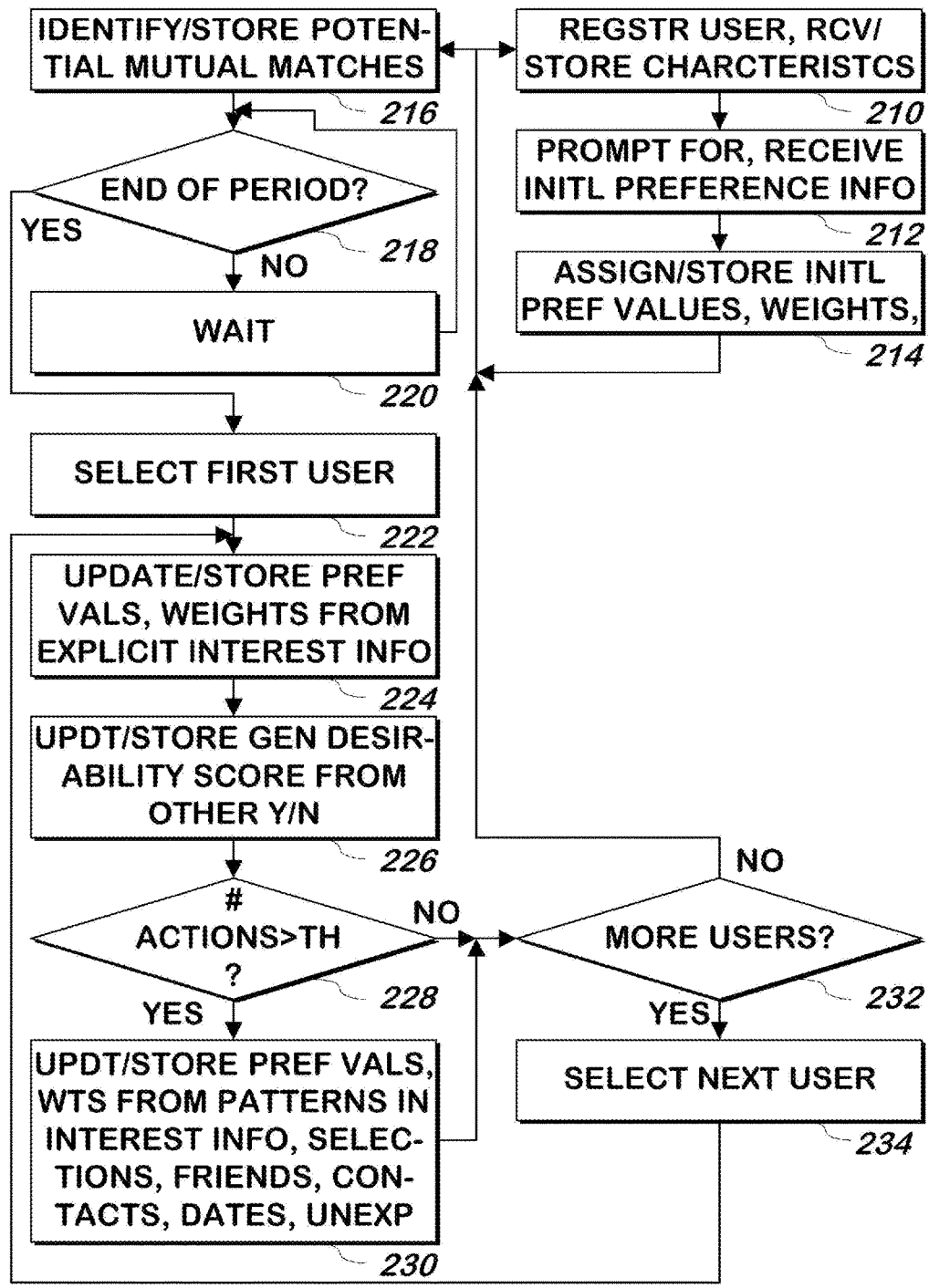
FIG. 2 is a flowchart illustrating a method of updating preference information for each of several consumers of resources according to one embodiment of the present invention.

Referring now to FIG. 2, a method of updating preference information for each of several consumers of resources is shown according to one embodiment of the present invention. As described herein, the resources and the consumers are all part of the same pool of registered users of an online dating service, but the present invention can apply to the selection of a target set of resources for one or more consumers, using a network. Thus, in the case of online dating and other situations, a user may be operating as a consumer and as a resource to other users. The term, 'user' as used herein may sometimes be described as a user acting as a consumer and other times as a user acting as a resource.

A user is registered, and values of characteristics that describe the user are received and stored associated with that user 210. Registration may include assigning or receiving a username and password for the user being registered. In one embodiment, characteristics may include physical characteristics, such as sex, height, weight, hair color and nationality of the user or the resource the user is providing, and may include nonphysical characteristics such as sexual orientation, religious beliefs, the degree to which the user practices their religion, and other nonphysical characteristics of the user or the resource the user is providing. As noted, the resource the user may be providing may be the user himself or herself.

Initial preference information is prompted for and received, and stored associated with the user 212. In one embodiment, initial preference information includes preferences of the user corresponding to that user's desire for a potential mate or potential date, though preferences in other embodiments may be generally described as preferences for the resource the user is seeking as a consumer. Preference information contains several items, and the items may include any or all of the characteristics described above. In one embodiment, preference information for each item on a list of potential preferences include a weight for that item and a value for that item. For example, a preference for height may include the value of a desired height, and a weight indicating how important the value for that item must be met in order for another user to be considered a potential match.

A value of a preference item may include a range of values. For example, the value for a height preference item may include "5'8" or above" or 5'8" to 6'2". A value for a preference item may include a selection of several or all possible values. For example, a value of a hair color preference may include "blonde" and "brown hair", or a single value that encompasses multiple potential values, such as "brunette".

Initial preference information may also include weights. The weights for a preference item indicate the importance of the item to a user. Weights may be expressed as a value, or as a function. For example, a preference item may be important to a user, but if the resource has a characteristic that closely matches the value of a different preference item (or several characteristics that closely match the value of a different preference item), the user may be willing to reduce the weight of the first item, and so the weight of the first item may be expressed as a function of one or more other items. For example, a user may indicate that they would prefer a college educated man over 5'8" tall, with each characteristic being of equal importance and hometown not being important at all, however, if someone is located from their hometown who went to the same college as the user, they would be willing to accept someone up to two inches shorter than 5'8", and such weight for the height item may be expressed as a function of the other two preference items. In one embodiment, the initial preference information is only described as a numeric value, but it may be adjusted at a later time by expressing it as a function, as additional information is collected from that user.

The preference information received as described above is stored associated with the user from which the preferences were received 214. The method continues at step 216 and step 210. Step 210 may be performed for another user, with any number of users registered and assigned initial preference values and weights, and step 216 may be performed for multiple users as described herein.

Overview of Potential Mutual Match.

Figure 4:
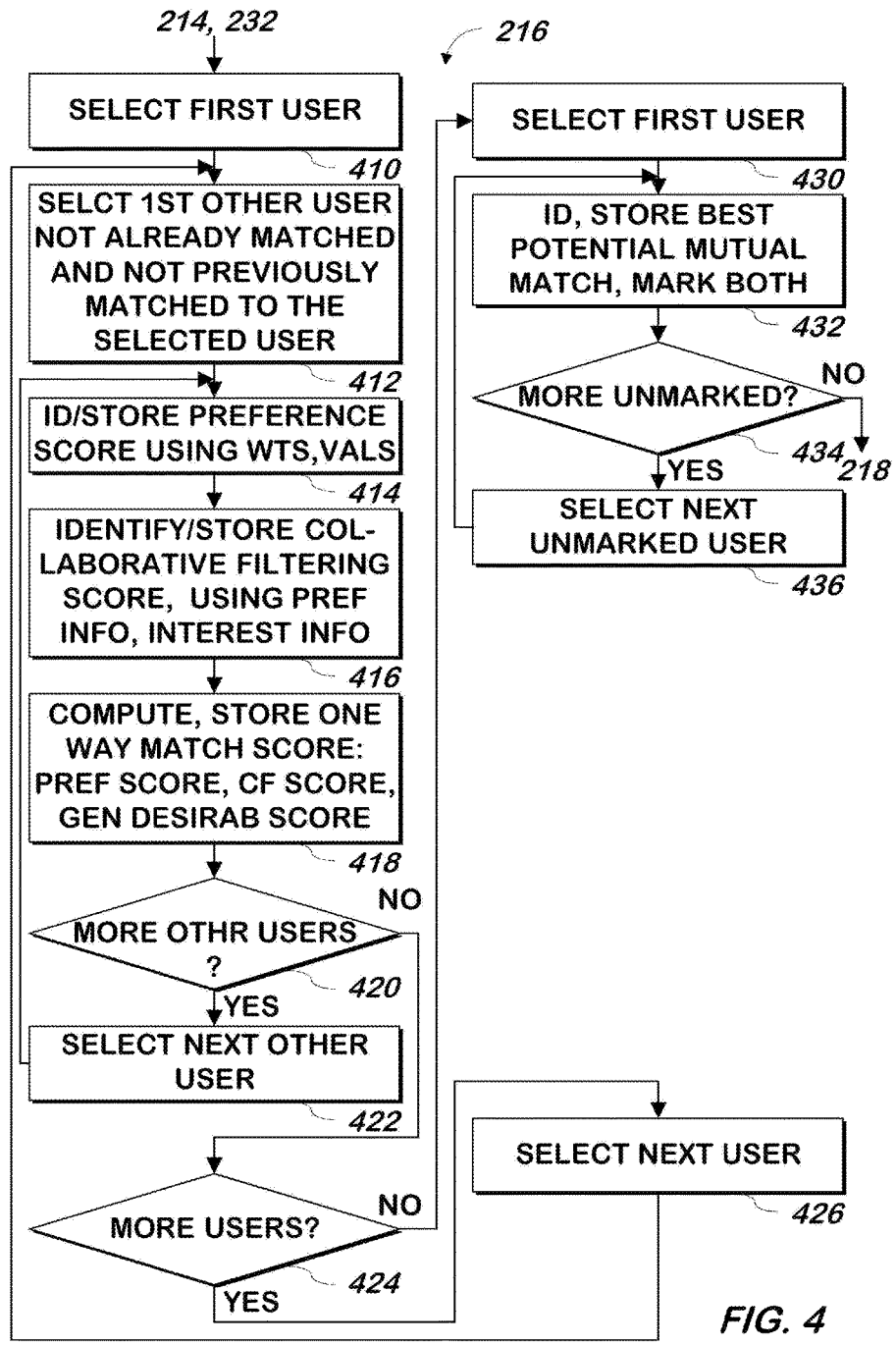
FIG. 4 is a flowchart illustrating a method of identifying potential mutual matches for several users according to one embodiment of the present invention.

Potential mutual matches are identified and stored 216 as described in more detail with respect to FIG. 4. In one embodiment, each potential mutual match is only applicable for a period of time, such as one day. If the end of such period has been reached 218, the method continues at step 222. Otherwise 218, the method waits 220 until the end of the period has been reached. Although such waiting is performed in one embodiment, other embodiments may perform some or all of the functions described below as soon as possible, such as when any one user of a potential mutual match provides interest information as described below, or when both such users of a potential mutual match have provided interest information.

Although the potential mutual matches are selected at the same time for all users as described herein, in other embodiments, potential mutual matches for a user are identified at the time the user logs in, unless that user has already been matched via a potential mutual match to another user.

User Views Potential Mutual Match, Performs Other Functions with Other User's Profiles At any time, a user may log in and view their potential mutual matches and perform other functions, such as viewing other user's profiles and the like. In one embodiment, many of the user's actions are used to discern preference information, as will now be described.

Figure 3:
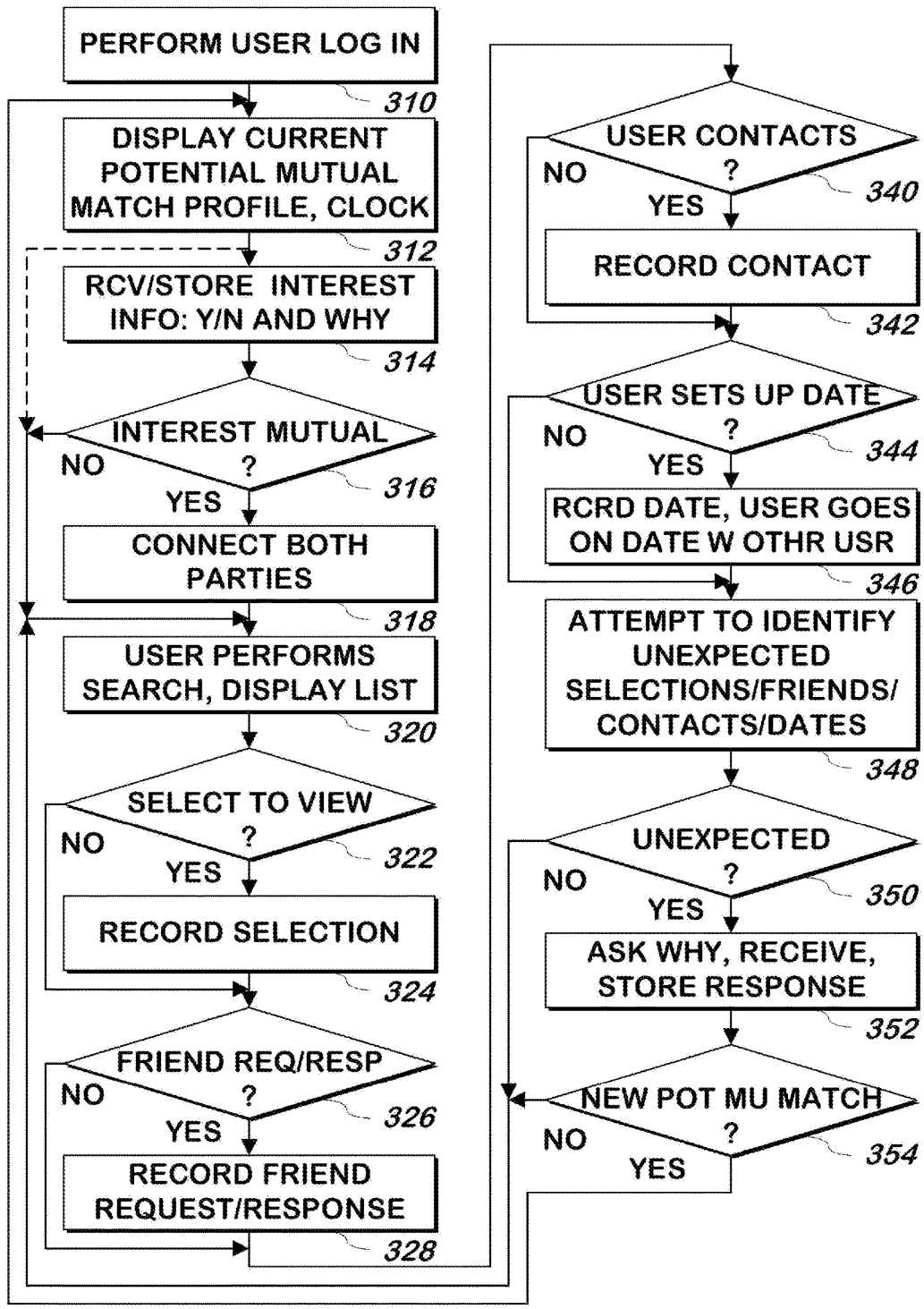
FIG. 3 is a flowchart illustrating a method of receiving information that may be used to discern preference information according to one embodiment of the present invention.

Referring now to FIG. 3, a method of receiving information that may be used to discern preference information is shown according to one embodiment of the present invention. A user login is performed 310. In one embodiment, performing a user log in includes receiving a user identifier and a password from a user via a user system on a network and attempting to match a password stored associated with that user identifier with the password and user identifier received from the user. In one embodiment, the date and time the user logged in is stored associated with the user.

The applicable potential mutual match for the user who logged in is displayed, including a photograph of the other user matched, information about the user such as the profile, and may include reasons the other user was selected for the match as well as reasons the user who logged in was selected for the match with the other user, along with a clock indicating an expiration time or expiration for that potential mutual match 312. The clock may be a countdown clock that changes value from time to time to indicate the amount of time remaining until the potential mutual match is no longer applicable, or otherwise indicates an amount of time. As described in more detail below, potential mutual matches are applicable only for one period, such as one day, and at the end of that period, they expire and are no longer applicable. However, a new potential mutual match is identified at the end of each period or when the user logs in following the end of the period for the last potential mutual match the user viewed, so an applicable potential mutual match will always be available for the user to view, in one embodiment. In one embodiment, the potential mutual match is displayed by displaying a photo of the other user of the potential mutual match, some or all of the characteristics provided by that other user describing the other user (such information may be referred to as the other user's profile), other statistics such as how many times that other user's profile was viewed, when they last logged on, etc, and the clock that counts down the amount of time remaining until that potential mutual match is expired and no longer applicable.

A representative display of a potential mutual match is shown in FIG. 5. A photograph of the other user 508 matched, along with the name 510 and profile information for that user 512 is displayed. Statistics 514 about that user and other user's actions with respect to that user are displayed. Information about why the users were matched 516, 518 is displayed. An updating countdown clock 520 is displayed. Icons 522-528 indicating actions to perform with the user and interest in the user are displayed. Text boxes 530, 532 the user can use to provide information about what the user liked or didn't like about the applicable match are displayed for the user to fill in and submit.

In one embodiment, the display is performed at the user's computer system, and data from the user is received at the user's computer system. Such information is received, stored and provided by a server over a network. In one embodiment, the data displayed in the profile represents physical characteristics of the other user, such as height and weight as well as compilation of physical actions performed, such as the number of other users who viewed that user's profile.

Interest information for the applicable potential mutual match is received from the user and stored associated with the user 314. In one embodiment, the user may skip step 314 (and come back to perform step 314 at a later time or at the next log in) and move directly to step 320 as indicated by the dashed line in the Figure, though in another embodiment, step 314 is required to be performed before other actions may be performed.

In one embodiment, interest information includes an indication as to whether the user is interested in the potential mutual match, or not interested, as well as information regarding reasons why the user is interested or not interested in the potential mutual match. For example, the user may indicate that they are not interested in the other user who is part of the potential mutual match because the other user is too short. Interest information may include characteristics liked and disliked by the other user, whether the user is interested in the other user or not.

If both parties associated with the potential mutual match indicate that they are interested in each other 316, both parties are connected 318, for example by providing their usernames to one another. The method continues at step 320. Otherwise 316, the method continues at step 320.

At step 320, the user may perform other actions, such as performing a search of other users based on desired values of characteristics that are specified by the user performing the search or specifying a user whose profile (e.g. the characteristics supplied by that other user and other statistics for the other user) is to be displayed. In the case of a search, a list of other users matching or approximately matching the characteristics provided for the search are displayed on a list (with a subset of the other user's profile information) from which the user may select for viewing any of the other users so displayed. If the user selects 322 one of the other users to view a more complete description of the selected other user, for example from the list displayed in step 320, the selection to view the profile of the other user is recorded associated with the user making the selection 324 and the method continues at step 326. Otherwise 322, the method continues at step 326. In one embodiment, any of the search parameters may be stored associated with the user.

In the case in which the user specifies the profile of the other user, the "yes" branch of step 322 is considered to have been taken although the recordation of the selection of that user may be indicated as having been made via direct specification rather than a search.

In one embodiment, a user may request another user to become a friend when viewing that other user's profile as described above, and the other user will receive a request, and can accept or deny the request. If the user requests the other user as a friend (i.e. the user "friends" the other user, a process that may be referred to as "friending" the other user) 326, or the other user responds to the request, the user identifier of the user other than the party taking such action and the action taken is stored associated with the user performing such action 328, and the method continues at step 340. Otherwise 326, the method continues at step 340.

In one embodiment, when viewing another user's profile, a user may contact another user. If the user contacts another user 340, the user identifier of the contact of the other user is stored associated with the user 342, and the method continues at step 344. Otherwise 340, the method continues at step 344.

In one embodiment, when sending a contact message to another user, a user may arrange or agree to a date with another user. To identify that a message is a date, the user may so indicate or the message may be scanned for words indicating it is a date, such as the specification of an address and/or a time, or a message indicating acceptance by the other user following such a message by the user. If a user arranges or agrees to a date with another user 344, the indication of a date with the other user set up by the user and the identifier of the other user is stored associated with the user 346, and the method continues at step 348. Otherwise 344, the method continues at step 348.

In one embodiment, the user goes on a date with the other user. This means two people physically move from two different locations to a third location, or the users call each other on the phone, with electronic circuits completing the call. The user may then use the information that the user gains from dates with other users to refine their preferences, either explicitly, for example, explicitly changing them or by changing the characteristics of other users with which they are willing to perform actions such as those described above. By going on a date, the user is considered to consume the resource, but other embodiments may have users performing other activities that consume the resource. For example, a resource may be shipped from one location to another location when a user purchases it.

To store an indication of an action by the user with another user, an identifier of the action and an identifier of the other user is stored associated with the user. The date and time the action was taken may also be stored.

In one embodiment, an attempt is made to identify unexpected search, viewing selections, friend requests or responses, contacts or dates that the user may have made as described above 348. An unexpected search, viewing selection, friend request or response, contact or date may be identified if such other user has one or more characteristics that are substantially different than would be expected by the then currently recorded preferences of the user making such selection to view, friend request or response, contact or date. For example, a user may indicate that the other user was already known to that user, or was introduced by a different user, or the user may indicate that although the other user really is too short, they were willing to make an exception because the other user had funny comments in their profile or had an attractive photo or another characteristic or set of characteristics that were highly desirable or that the user is willing to expand desired characteristics from their initial values. If any such selections to view, friend requests or responses, contacts or dates are identified 350, the user is asked why and a response to the question is received and stored associated with the user 352, and the method continues at step 324. Otherwise 350, the method continues at step 354.

At step 354, if a new potential mutual match is applicable to the user, for example, because the time period for the most recent potential mutual match has expired, the method continues at step 312 using the newly applicable potential mutual match. Otherwise 354, the method continues at step 320 or step 322 (for example, the user selects to view a different other user from the same search).

Process Information Received.

As described herein, periodically, information received from different users is processed to enable a better potential mutual match when the next such match is performed. In the embodiment in which such matching is performed when users log in, the processing of the information received as described herein may be performed prior to making the next potential mutual match.

At step 222, a first user is selected. The user selected is one from whom any information processed as described below has been received since the last time the user was selected for processing. Such information may be interest information received from the user, interest information received from an other user matched to the user in a potential mutual match or other information about the user's actions recorded as described below. In one embodiment, if interest information from the other user in a potential mutual match is not received, but such other user logged in and did not provide any interest information regarding the user for such potential mutual match, the other user is considered to have rejected the user or rejected the user to a lesser degree than if the other user had explicitly rejected the user, and so that other user is considered to have provided interest information for the user and, as a result, the user will be selected at step 222, even if no other information for the user was received.

The preference values and weights of the selected user from which any interest information was received are updated using any interest information received from the selected user 224. For example, if the selected user indicated the other user in the selected user's potential mutual match was too tall, the height of such other user is used to adjust a maximum height preference item for the selected user, for example, by ensuring that it is not higher than the height of such other user, or reducing such maximum in that direction. For example, if the other user is 5'11" but the selected user had previously stated that their maximum acceptable height for a potential mutual match was 6'2", the maximum height preference item for the selected other user may be reduced to 6'1" in one embodiment, or 5'11" in another embodiment.

The indication regarding whether an other user that was part of the selected user's potential mutual match indicated that such other user would like to date the selected user, is retrieved, and a general desirability score for the selected user is updated using such retrieved information 226. The general desirability score may be the number of other users who have viewed the user as a mutual potential match, who indicated that they would like to date the user, divided by the total number of other users who have viewed the user as a mutual potential match. In one embodiment, an other user who explicitly rejects the user may have a greater effect on the general desirability score of that user than one who views the user but does not explicitly accept or reject that user, as determined by the fact that the other user logged in but did not explicitly accept or reject the selected user. In one embodiment, more recent indications may have a greater effect on the user's general desirability score than older indications. In one embodiment, only indications received since the last time the user updated their profile (including the photos or photos) are used to compute the general desirability score for that user.

In one embodiment, in addition to the explicit interest information, implied preference information may be used to update the user's preference information based on actions of the user. Implied preference information is information that is provided by the user that does not explicitly state a preference, such as information that may be discerned from a user's actions. Such actions may include rejecting or accepting a mutual potential match, selecting to view a profile of another user, for example one which the user has located as part of a search, identifying another user as a friend or requesting another user to become a friend, contacting another user, or setting up a date with another user. Each of the various types of implied preference information (e.g. the information discerned from various actions) may be used to alter a user's preferences (e.g. the weights and values stored as preference items for that user) in a different manner, or to a different degree. In one embodiment, a threshold number of actions from which implied preference information may be obtained must be received before such alternate preference indications are used to adjust the preferences of the user to which they correspond. If such a threshold has been reached 228, the preference values and weights for that user are updated 230 by identifying patterns in the potential mutual matches accepted or rejected by that user, searches, viewing selections, friend requests and responses (in one embodiment, a friend request that is not responded to after a certain period of time following the next log in of the recipient of the request is considered a rejection or something less than a rejection), contacts, and dates of that user while accommodating the explanations of unexpected actions of the user as described above. The method continues at step 232. If the number of alternate preference indications has not exceeded the threshold 228, the method continues at step 232.

At step 232, if there are more users, the next user is selected 234, and the method continues at step 224 using the newly selected user. If there are no more users 232, the method continues at step 218.

Identifying Potential Mutual Matches.

The method of identifying potential mutual matches as described above in step 216 may be performed in any of a number of ways. A potential mutual match may be identified for each of many users in a batch as described below, or users may be matched as they log in. In one embodiment, a combination of techniques may be used: users who have logged in recently are matched in a batch and less frequent users are matched when they log in.

Referring now to FIG. 4, a method of identifying potential mutual matches for several users in a batch is shown according to one embodiment of the present invention. From steps 214 or 232 of FIG. 2, as described above, a user is selected 410. In one embodiment, the user is selected from among those users who have logged in within a threshold amount of time, such as under 7 days ago. An other user not previously matched to the selected user is selected 412. In one embodiment the other user is selected from among users who have logged in within a threshold amount of time, such as under 7 days ago.

A preference score is identified that attempts to predict the preference of the selected user for the other user using weights and values of the selected user and the characteristics of the other user, and such score is stored associated with a tuple containing an identifier of the selected user and an identifier of the selected other user 414.

A collaborative filtering score is identified for the user and other user based on the interest information of users who have previously been matched with the selected other user via a prior potential mutual match and the similarity of the preference information of such previously matched users with preference information of the selected user and the collaborative filtering score is stored associated with the tuple 416. For example, if one of such previously matched other users has preference information that is similar to that of the selected user, and such previously matched user indicated that they were interested in such other user, a higher collaborative filtering score would be provided for such other user than if the previously matched other user had indicated that they were not interested in such selected other user.

A one way match score indicating the suitability of the selected other user for the selected user is identified as a function of the preference score for the selected user and selected other user, collaborative filtering score for the selected user and the selected other user, and the general desirability score of the selected other user and the one way match score is stored associated with the tuple 418. For example, each of the individual scores may be multiplied by a factor and then the products of the factors and their respective scores may be summed. If there are more other users that have not been previously matched to the selected user 420, the next such other user is selected 422, and the method continues at step 414, using the newly selected other user.

If there are no more such other users 420, if there are more users 424, the next user is selected 426, and the method continues at step 412 using the newly selected user. If there are no more users 424, the method continues at step 430. The newly selected user and other users are selected from the pool of users and other users described above for such selections (e.g. last log in was under 7 days ago).

At step 430, a first user is selected, and the best potential mutual match 432 is identified based on the one way match score of the selected user for each such other user for which a one way match score was computed, and one way match score of the other users for the selected user.

The selected user and other user corresponding to the best potential mutual match are marked as having been matched as part of step 432. If there are more on more users 434, the next such unmarked user is selected 436, and the method continues at step 432 using the newly selected unmarked user. If there are no unmarked users 434, the method continues at step 218.

In one embodiment, selection of the user at steps 430 and 436 may include selecting a user for which the one way match score of the selected user and one other unmarked user are each above a threshold, and for which the number of other such other users is not higher than any other unmarked user. The other user matched with the selected user may be one that maximizes the sum of the one way match scores among users for which the one way match score in each direction exceeds a threshold.

In one embodiment, instead of selecting one user, identifying a potential mutual match with another user and then removing those two users from the pool, a maximization algorithm is used to maximize the sum of the one way match scores for each potential mutual match made.

Thus, as is described herein, a "match" need not be an exact match of another user with the user's preferences, express and implied, it may be a correspondence with the user's preferences, express and implied as described above. As indicated above, the selected user and the other user may be selected for the best potential mutual match based in part by these two user's interactions with still other users and the information of such other users.

System.

Figure 6:
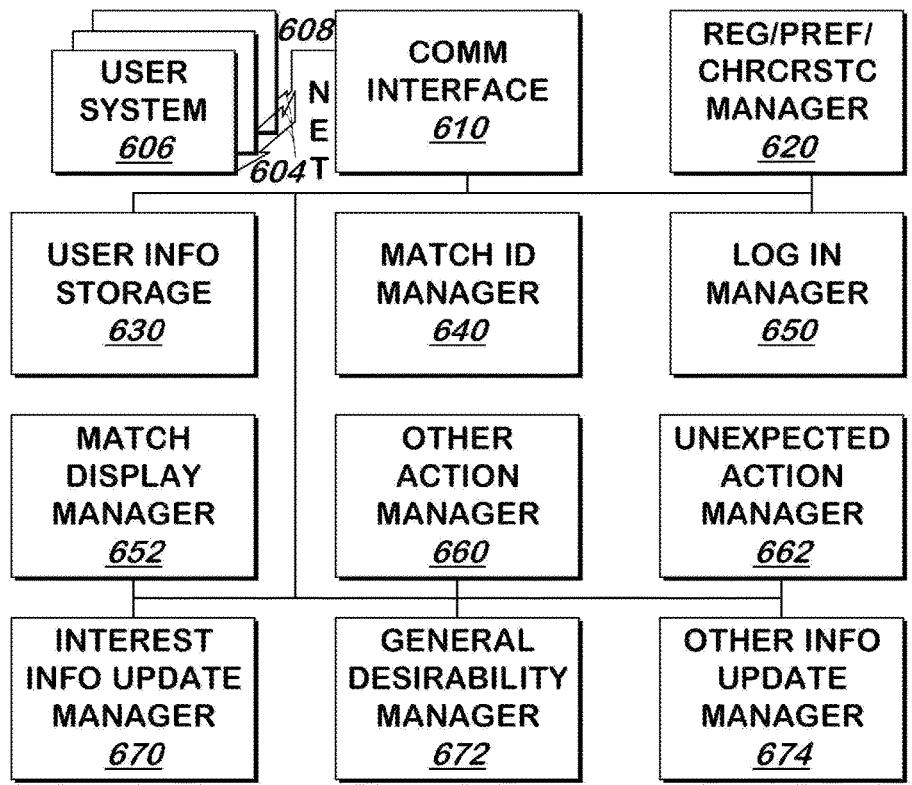
FIG. 6 is a block schematic diagram of a system for receiving information that may be used to discern preference information, receiving and updating preference information from users and for matching users to resources according to one embodiment of the present invention.

Referring now to FIG. 6, a system for matching consumers with resources is shown according to one embodiment of the present invention. In a manner similar to that described above, FIG. 6 will be described as if the users are both resources and the consumers of other resources, but other arrangements, such as entities that provide resources and entities, that are different from the first entities, that consume resources, may also be matched by the system of FIG. 6.

User System.

User system 606 includes a conventional personal computer running a conventional browser or such as those described above. In one embodiment there are multiple user systems and multiple users. Any number of user systems 606 may be connected to the remainder of the system shown in FIG. 6. User systems 606 are coupled to the remainder of the system of FIG. 6 via network 604. Network 604 is a conventional computer network, such as the Internet, an Ethernet network, or both of these. Network 604 is coupled to user systems such as user system 606, as well as input/output 608 of communication interface 610.

The remainder of the system of FIG. 6 may operate as a conventional server computer system, with user systems 606 operating as client computer systems. In one embodiment, the server computer system includes a conventional web server.

Communication interface 610 is a conventional communication interface running TCP/IP, Ethernet, and other communication protocols. All communication between users and the server of FIG. 6 is performed by communication between their respective user systems 606 and communication interface 610.

Registration/preference/characteristic manager 620 provides a web page that provides a conventional user interface that receives a username and password, and registers users as described above, and stores the username and password of each user registered into user information storage 630. Registration/preference/characteristic manager 620 prompts for and receives the initial preference information as described above, and stores such initial preference information into user information storage 630 associated with the username corresponding to the user from which it was received.

Registration/preference/characteristic manager 620 assigns and stores into user information storage 630 initial preference values and weights as described above.

Match identification manager 640 periodically identifies potential mutual matches as described above using the information in user information storage 630. Information about the potential mutual match of each user is stored in user information storage 630 associated with each of the user identifiers corresponding to the match identification manager 640 makes. In one embodiment, match identification manager 640 stores in user information storage 630 associated with each match it makes the date and time that the potential mutual match will expire as described above.

Composition of Match Identification Manager.

Figure 7:
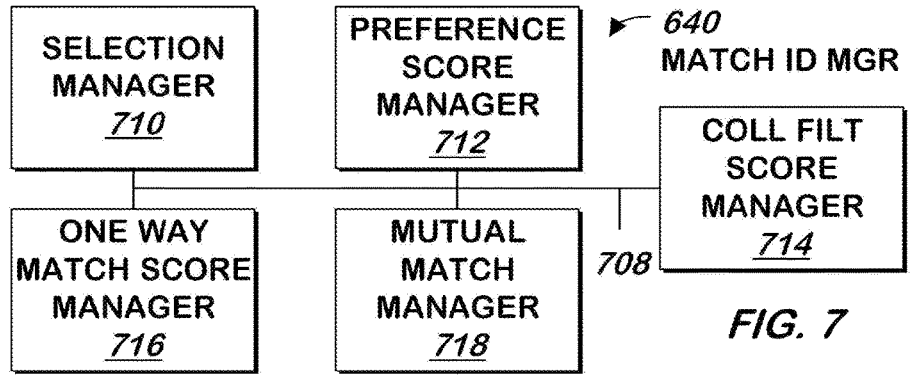
FIG. 7 is a block schematic diagram of a match identification manager of FIG. 6 according to one embodiment of the present invention.

Referring now to FIG. 7, a match identification manager 640 of FIG. 6 is shown in more detail according to one embodiment of the present invention. As will now be described, users may be prematched prior to log in, however, in other embodiments, they may be matched as they log in or at another time.

At the start of each period selection manager 710 selects users and other users as described above with respect to steps 410, 412, and 420-424 of FIG. 4. Each time it selects a new combination of user and other user as described above, selection manager 710 provides a tuple containing the identifiers of the user and the other user selected above to preference score manager 712, which computes a preference score using the preferences of the user referenced in the tuple and the characteristics of the selected other user referenced in the tuple as described above and provides to collaborative filter score manager 714 a preference score and the tuple it received containing the identifiers of the users.

When it receives the preference score and the tuple, collaborative filter score manager 714 computes the collaborative filter score using the preferences of the user in the tuple it receives and the actions of different users, who have preferences similar to the user in the tuple that such different users may have performed with the other user in the tuple as described above, and provides the preference score, collaborative filter score and the tuple it received containing the identifiers of the users to one-way match score manager 716.

When it receives the preference score, the collaborative filter score and the tuple, one-way match score manager 716 retrieves from user information storage 630 the general desirability score of the other user in the tuple and uses the general desirability score of the other user, and the preference score and the collaborative filtering score it receives to provide a one-way match score as described above, stores into user information storage 630 the one-way match score along with the tuple of the two user identifiers described above, and signals selection manger 710. When signaled, selection manager 710 then selects a new other user, or if no such other users are available for selection, selects a new user and a first other user, and initiates the scoring process described above until the one-way match scores for all users it may select as described above have been computed and stored.

When all such one way match scores of users that may be selected by selection manager 710 have been computed (e.g. selection manager 710 reaches the equivalent of the no branch of step 424 of FIG. 4), selection manager 710 signals mutual match manager 718, which uses the one-way match scores stored in user information storage 630 to identify the best potential mutual matches of each of the users as described above. Mutual match manager 718 stores in user information storage 630 the expiration date and time of each potential mutual match, and user identifiers of the users matched, associated with both users of each match.

Components Handling User Log in.

Referring again to FIG. 6, at any time, a user may use user system 606 to log in to the server of FIG. 6. When the user attempts to log in, communication interface 610 connects user system 606 to log-in manager 650. In response, log in manager 650 provides a web page to allow the user to provide log in information, receives such information and performs the conventional log-in function described above using the user identifier and passwords stored in user information storage 630. If the log-in is successful, log-in manager 650 provides the user identifier of the user logged in to match display manager 652 in the embodiment in which the users are pre matched. In the embodiment in which users are matched as they log in, log in manager 650 checks user interface storage 630 for an unexpired potential mutual match for the user who just logged in. If one exists, log in manager 650 provides the user identification of such user to match display manager 652.

In the embodiment in which users are matched as they log in, if there is no currently applicable (i.e. unexpired) potential mutual match for the user who logged in, log-in manager 650 provides the user identifier of the user who successfully logged in to selection manager 710 of match identification manager 640. In this embodiment, selection manager 710 operates as described above, except that it only selects as the user, the user having the identifier it receives (but selects the different other users as described above, with the exception that users already assigned to an applicable potential mutual match are not selected as an other user). Preference score manager 712, collaborative filter score manager 714, and one-way match score manager 716 not only compute and provide as described above their respective scores for the user, but also compute the corresponding score for the other user as the user, using the user as the other user. One way match score manager 716 will also store the one way match score from the other user to the user when it stores the one way match score of the user to the other user as described above. When it has finished selecting and initiating the assignment of one way match scores with the other users, selection manager 710 provides the identifier of the user it received to mutual match manager 718.

When it receives the user identifier, mutual match manager 718 selects a potential mutual match for the user corresponding to the user identifier it receives using the one way match scores (for the user and the other users) associated with the user whose identifier it receives, such as selecting the user and other user that each have the lowest one-way match score exceeding a threshold, or selecting the highest total sum of the two one way match scores that each exceeds a threshold value, assigns such potential mutual match for the user and the other user in user storage 630 and signals log-in manager 650. When so signaled, log-in manager 650 then provides to match display manager 652 the user identifier of the user who logged in.

Components Handling Display of Potential Mutual Matches and Receipt of Interest Information.

When it receives the user identifier as described above, match display manager 652 uses the user identifier it receives to retrieve the then applicable potential mutual match and provides data representing the potential mutual match to the user system 606, whose conventional browser renders such potential mutual match onto the display screen as described above.

Figure 8:
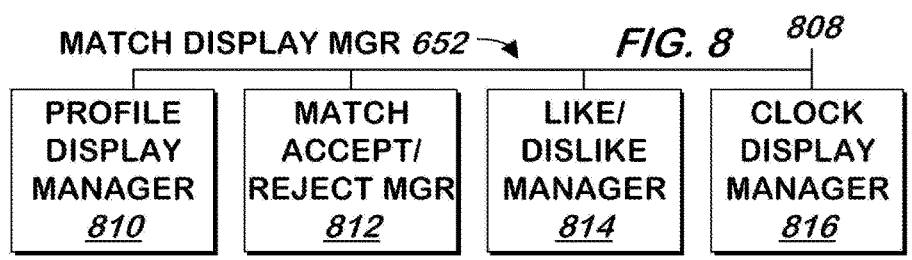
FIG. 8 is a block schematic diagram of a match display manager of FIG. 6 according to one embodiment of the present invention.

Referring now to FIG. 8, a match display manager 652 is shown in more detail according to one embodiment of the present invention. Profile display manager 810 receives the user identifier of the user, and retrieves the user identifier of the other user matched to such user and retrieves from user information storage 630 and provides to user system 606 for display a photograph and profile information of the other user and may provide for display other statistics of the other user as described above. In one embodiment, one or more photographs are received from the user and stored into user storage 630 associated with that user's username by registration/preference/characteristic manager 620. Profile display manager 810 provides to match accept reject manager 812, the like/dislike manager 814, and clock display manager 816, the identifier of the user who logged in or is otherwise viewing the potential mutual match.

When it receives the user identifier, match accept reject manager 812 provides for display icons or other controls to allow the user receiving the potential mutual match to indicate whether or not that user is interested in the other user corresponding to the potential mutual match. Match accept reject manager 812 receives an indication from the user indication whether the user is interested in the other user of the user's potential mutual match and stores into user information storage 630 such indications associated with the user from which the indication was received. If the user indicates interest in the other user, match accept reject manager 812 checks to determine whether the other user corresponding to the same potential mutual match has also indicated their interest in the user. If so, match accept reject manager 812 provides the username of each user to the other user of the potential mutual match.

When it receives the identifier of the user, like/dislike manager 814 provides to the user system 606 one or more text boxes or other controls that the user may use to indicate why they are, or are not, interested in the other user corresponding to the potential mutual match. Like/dislike manager 814 receives any such information provided by the user and stores such information into user information storage 630 associated with the user from which it was received.

When it receives the identifier, of the user, clock display manager 816 retrieves from user storage 630 the expiration time of the potential mutual match applicable to such user and provides to user system 606 for display to the user an updating clock display program or script that provides a periodically updating clock indicating the amount of time remaining until such applicable match expires. The program or script will signal log in manager 650 if it is running at the time of such expiration, at which point log in manager 650 will operate as if the user had just logged in and will initiate the assignment and/or display of a newly currently applicable potential mutual match.

Components Handling Other User Actions.

Referring again to FIG. 6, other action manager 660 provides icons onto displayed web pages that allow the user to perform other actions (e.g. search, select to view, friend request or response, etc.) as described above, and provides suitable web interface controls onto that page or other pages to allow the user to indicate the action desired and to provide parameters to the actions the user is requesting, such as desired characteristics to be searched, or user names of members whose profile that user would like to view, or who the user would like to contact or set up a date. Other action manager 660 provides appropriate responses to such requests for actions using conventional methods. For example, if the user performs a search, other action manager 660 may provide for display search results using conventional techniques by using the information stored in user storage 630. If the user selects to view the profile of a user whose profile is summarized in the search results, other action manager 660 provides to user system 606 for display the profile of the selected user from user storage 630.

In addition, other action manager 660 stores in user information storage 630 associated with the user requesting the action, the date and the time the action was performed, and indication of the action requested, and any parameters provided by the user.

Other action manager 660 may provide the indication of the action, and the parameters to unexpected action manager 662, which uses any or all of the action, parameters of the action specified by the user, the characteristics stored in user information storage 630 of any user specified by a parameter and the preference information for the user requesting such action stored in user information storage 630 to determine whether such other action is an unexpected action as described above because it indicates a preference for one or more users that is inconsistent with one or more preferences of the user requesting the action. If so, unexpected action manager 662 may provide a web page to the user system 606 prompting the user to explain why such action was taken as described above. Unexpected action manager 662 receives such information and stores such information received from the user into user information storage 630 associated with the user. Additionally, unexpected action manager 662 may update the user's preference information stored in user information storage resulting from the information received from the user and the original action, its parameters, and the characteristics of any specific user.

Components Updating User Preference Information.

In one embodiment, when match accept reject manager 812 of FIG. 8 or like/dislike manager 814 stores information into user information storage 630, the entity 812, 814 storing such information signals interest information update manager 670 with the user identifier of the user from which such interest information was received, and interest information update manager 670 uses such information received to update in user information storage 630 the preference information for that user as described above. Match accept reject manager 812 additionally signals general desirability manager 672 with the user identifier of the other user corresponding to a potential mutual match when it stores an indication of whether the user accepts the match as described above. When it receives such user identifier, general desirability manager 672 updates that user's general desirability score as described above.

If unexpected action manager 662, determines the action was not unexpected, unexpected action manager 662 provides the user identifier of the user performing the action to other information update manager 674, which determines whether there is sufficient information received from that user to update the user's preference information, and if so, updates the user's preference information using the actions and any parameters stored for that user as described above.

In one embodiment, the date and time is stored into user information storage 630 by the various elements (e.g. 620, 812, 814, 662 and 660) that store such information and such date and time information is also used to perform the functions described above by the elements (e.g. 662-674) that update such information, in the manner described above.

Certain Embodiments of the Present Invention

Described is a method of identifying and providing a potential mutual correspondence of resources offered and interests in resource between two different resource providers of multiple resource providers offering their resources over a network and displaying the potential mutual correspondence to at least one of the resource providers via the network, the method including: receiving at a first computer system coupled to the network, via multiple second computer systems coupled to the network, characteristics about the resources being provided by each of the multiple resource providers; receiving at the first computer system via the multiple second computer systems via the network from each of the multiple resource providers, explicit preference information for characteristics of the resources desired by said resource provider; receiving at the first computer system multiple indications of actions taken by each of the multiple resource providers regarding individual other resource providers, the actions having been taken for purposes other than providing preference information for characteristics of the resources desired by said resource provider; identifying at the first computer system the potential mutual correspondence between the two different resource providers responsive to the characteristics of the two different resource providers, the explicit preference information received from the two different resource providers and at least one other of the multiple resource providers and at least some of the indications of actions of at least some of the multiple resource providers taken towards at least one of the two different resource providers; and providing from the first computer system to at least one of the multiple second computer systems, an indication of at least one of the two different resource providers for which the potential mutual correspondence was identified to the other of the two different resource providers, responsive to the identifying step.

The method includes optional additional features whereby at least some of the actions of at least some of the multiple resource providers taken towards at least one of the two different resource providers comprise viewing one of said at least one of the two different resource providers.

The method includes optional additional features whereby at least some of the actions of at least some of the multiple resource providers taken towards at least one of the two different resource providers comprise rejecting said at least one of the two different resource providers.

The method includes optional additional features whereby at least some of the actions of at least some of the multiple resource providers taken towards at least one of the two different resource providers comprise arranging a date with one of said at least one of the two different resource providers.

The method includes optional additional features whereby at least some of the actions of at least some of the multiple resource providers taken towards at least one of the two different resource providers comprise rejecting at least one of the two different resource providers.

The method includes optional additional features whereby the potential mutual correspondence is identified additionally responsive to the date on which the actions were taken.

The method may additionally include receiving, before the characteristics are received, earlier characteristics that differ from the characteristics received, from each of at least one of the two different resource providers; and includes optional additional features whereby the identifying the potential mutual correspondence excludes indications of actions taken towards the at least one of the two different resource providers from which the earlier characteristics were received, after the earlier characteristics are received and before the characteristics are received.

Described is a system for identifying and providing a potential mutual correspondence of resources offered and interests in resource between two different resource providers of multiple resource providers offering their resources over a network and displaying the potential mutual correspondence to at least one of the resource providers via the network, the system including: a registration/preference/characteristic manager at a first computer system including a hardware processor system coupled to a memory system and having an input coupled to a network for receiving via multiple second computer systems coupled to the network, user identifiers, characteristics about the resources being provided by each of the multiple resource providers and explicit preference information for characteristics of the resources desired by said resource provider, the registration/preference/characteristic manager for providing at an output for each of the multiple resource providers, the user identifier of said resource provider, the characteristics received from such resource provider, and the explicit preference information received from said resource provider at the registration/preference/characteristic manager input; an other action manager at the first computer system including the hardware processor system coupled to the memory system and having an input coupled for receiving at the first computer system multiple indications of actions taken by each of the multiple resource providers regarding individual other resource providers, including the user identifier of the resource provider taking the action and the user identifier of said individual other resource provider, the actions having been taken for purposes other than providing preference information for characteristics of the resources desired by said resource provider, the other action manager for providing at an output, for each action, the user identifier of each resource provider, an identifier of the action and the user identifier of the other resource provider; an identification manager at the first computer system including the hardware processor system coupled to the memory system and having an input coupled to the registration/preference/characteristic manager output for receiving at least some of the user identifiers, the characteristics, and the explicit preference information, and to the other action manager output for receiving at least some of the user identifiers, identifiers of the actions and the user identifiers of the other resource providers, the identification manager for identifying the potential mutual correspondence between the two different resource providers responsive to the characteristics of the two different resource providers, the explicit preference information received from the two different resource providers and at least one other of the multiple resource providers and at least some of the identifiers of the actions of at least some of the multiple resource providers taken towards at least one of the two different resource providers, and providing the user identifiers of the two different resource providers at an output; and a display manager at the first computer system including the hardware processor system coupled to the memory system and having an input coupled to the identification manager output for receiving the user identifiers of the two different resource providers, the display manager for providing at an output coupled to the network, to at least one of the multiple second computer systems, an indication of at least one of the two different resource providers for which the potential mutual correspondence was identified to the other of the two different resource providers, responsive to the user identifiers received at the display manager input.

The system includes optional additional features whereby at least some of the actions of at least some of the multiple resource providers taken towards at least one of the two different resource providers comprise viewing one of said at least one of the two different resource providers.

The system includes optional additional features whereby at least some of the actions of at least some of the multiple resource providers taken towards at least one of the two different resource providers comprise rejecting said at least one of the two different resource providers.

The system includes optional additional features whereby at least some of the actions of at least some of the multiple resource providers taken towards at least one of the two different resource providers comprise arranging a date with one of said at least one of the two different resource providers.

The system includes optional additional features whereby at least some of the actions of at least some of the multiple resource providers taken towards at least one of the two different resource providers comprise rejecting at least one of the two different resource providers.

The system includes optional additional features whereby:

the other action manager additionally provides at the other action manager output a date on which each action was performed;

the identification manager input is additionally for receiving the date on which each action was performed; and the identification manager identifies the potential mutual correspondence additionally responsive to the date on which the actions were taken.

The system includes optional additional features whereby:

the other action manager additionally provides at the other action manager output a date on which each action was performed;

the identification manager input is additionally for receiving the date on which each action was performed;

the registration/preference/characteristic manager input is additionally for receiving, before the characteristics are received, earlier characteristics that differ from the characteristics received, from each of at least one of the two different resource providers;

the registration/preference/characteristic manager additionally provides at the registration/preference/characteristic manager output the earlier characteristics, at least one date the earlier characteristics were received and the dates the characteristics were received;

the identification manager input is additionally for receiving the earlier characteristics, the at least one date the earlier characteristics were received and the dates the characteristics were received; and the identification manager identifies the potential mutual correspondence by at least reducing an effect of indications of actions taken towards the at least one of the two different resource providers from which the earlier characteristics were received, after the date the earlier characteristics are received and before the date the characteristics are received.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

Described is a computer program product including a non-transitory computer useable medium having computer readable program code embodied therein for identifying and providing a potential mutual correspondence of resources offered and interests in resource between two different resource providers of multiple resource providers offering their resources over a network and displaying the potential mutual correspondence to at least one of the resource providers via the network, the computer program product including computer readable program code devices configured to cause a computer system to: receive at a first computer system coupled to the network, via multiple second computer systems coupled to the network, characteristics about the resources being provided by each of the multiple resource providers; receive at the first computer system via the multiple second computer systems via the network from each of the multiple resource providers, explicit preference information for characteristics of the resources desired by said resource provider; receive at the first computer system multiple indications of actions taken by each of the multiple resource providers regarding individual other resource providers, the actions having been taken for purposes other than providing preference information for characteristics of the resources desired by said resource provider; identify at the first computer system the potential mutual correspondence between the two different resource providers responsive to the characteristics of the two different resource providers, the explicit preference information received from the two different resource providers and at least one other of the multiple resource providers and at least some of the indications of actions of at least some of the multiple resource providers taken towards at least one of the two different resource providers; and provide from the first computer system to at least one of the multiple second computer systems, an indication of at least one of the two different resource providers for which the potential mutual correspondence was identified to the other of the two different resource providers, responsive to the computer readable program code devices configured to cause the computer system to identify.

The computer program product may include additional features whereby at least some of the actions of at least some of the multiple resource providers taken towards at least one of the two different resource providers comprise viewing one of said at least one of the two different resource providers.

The computer program product may include additional features whereby at least some of the actions of at least some of the multiple resource providers taken towards at least one of the two different resource providers comprise rejecting said at least one of the two different resource providers.

The computer program product may include additional features whereby at least some of the actions of at least some of the multiple resource providers taken towards at least one of the two different resource providers comprise arranging a date with one of said at least one of the two different resource providers.

The computer program product may include additional features whereby at least some of the actions of at least some of the multiple resource providers taken towards at least one of the two different resource providers comprise rejecting at least one of the two different resource providers.

The computer program product may include additional features whereby the potential mutual correspondence is identified additionally responsive to the date on which the actions were taken.

The computer program product:

may additionally include computer readable program code devices configured to cause the computer system to receive, before the characteristics are received, earlier characteristics that differ from the characteristics received, from each of at least one of the two different resource providers; and may include additional features whereby the computer readable program code devices configured to cause a computer system to identify the potential mutual correspondence exclude indications of actions taken towards the at least one of the two different resource providers from which the earlier characteristics were received, after the earlier characteristics are received and before the characteristics are received.

Described herein is a method of identifying and providing a potential mutual correspondence of resources offered and interests in resource between two of a plurality of resource providers offering their resources over a network and displaying the potential mutual correspondence to at least one of the resource providers via the network, the method including receiving at a first computer system coupled to the network, via a plurality of second computer systems coupled to the network, characteristics about the resources being provided by each of the plurality of resource providers, receiving at the first computer system via the plurality of second computer systems via the network from each of the plurality of resource providers, explicit preference information for characteristics of the resources desired by said resource provider, receiving at the first computer system a plurality of indications of actions taken by each of the plurality of resource providers regarding individual other resource providers, the actions having been taken for purposes other than providing preference information for characteristics of the resources desired by said resource provider, identifying at the first computer system the potential mutual correspondence between the two resource providers responsive to the characteristics of the two resource providers, the explicit preference information received from the two resource providers and at least one other of the plurality of resource providers and at least some of the indications of actions of the two resource providers and at least one other of the plurality of resource providers, and providing from the first computer system to at least one of the plurality of second computer systems, an indication of at least one of the two resource providers for which the potential mutual correspondence was identified to the other of the two resource providers, responsive to the identifying step.

In one embodiment, the potential mutual correspondence has an expiration date and time, and the method additionally includes displaying an indication of the expiration date and time.

In one embodiment, at least one of the actions action is a selection of one of the plurality of resource providers user from results of a search.

In one embodiment, at least one of the actions is a request or a response to a request to indicate a relationship with one of the plurality of resource providers.

In one embodiment, at least one of the actions is a sending of a message to one of the plurality of resource providers.

In one embodiment, at least one of the actions is an indication that a previously identified potential mutual correspondence between one of the two resource providers and one of the plurality of users was or was not of interest to the at least one of the two users.

In one embodiment, the identifying step is additionally responsive to a number of the plurality of resource providers who have indicated an interest in at least one of the two resource providers.

In one embodiment, the interest is indicated responsive to one of the at least one of the two resource providers being identified as part of a prior potential mutual correspondence between such resource provider and each of at least one of the other of the plurality of resource providers identified prior to the identifying step.

Additionally, there is a system. The system is for identifying and providing a potential mutual correspondence of resources offered and interests in resource between two of a plurality of resource providers offering their resources over a network and displaying the potential mutual correspondence to at least one of the resource providers via the network, the system includes a registration/preference/characteristic manager at a first computer system having an input coupled to a network for receiving via a plurality of second computer systems coupled to the network, user identifiers, characteristics about the resources being provided by each of the plurality of resource providers and explicit preference information for characteristics of the resources desired by said resource provider, the registration/preference/characteristic for providing at an output for each of the plurality of resource providers, the user identifier of said resource provider, the characteristics received from such resource provider, and the explicit preference information received from said resource provider at the registration/preference/characteristic manager input, an other action manager at the first computer system having an input coupled for receiving at the first computer system a plurality of indications of actions taken by each of the plurality of resource providers regarding individual other resource providers, comprising the user identifier of the resource provider taking the action and the user identifier of said individual other resource provider, the actions having been taken for purposes other than providing preference information for characteristics of the resources desired by said resource provider, the other action manager for providing at an output, for each action, the user identifier of each resource provider, an identifier of the action and the user identifier of the other resource provider, an identification manager at the first computer system having an input coupled to the registration/preference/characteristic manager output for receiving at least some of the user identifiers, the characteristics, and the explicit preference information, and to the other action manager output for receiving at least some of the user identifiers, identifiers of the actions and the user identifiers of the other resource providers, the identification manager for identifying the potential mutual correspondence between the two resource providers responsive to the characteristics of the two resource providers, the explicit preference information received from the two resource providers and at least one other of the plurality of resource providers and at least some of the identifiers of the actions of the two resource providers and at least one other of the plurality of resource providers and providing the user identifiers of the two resource providers at an output, and a display manager at the first computer system having an input coupled to the identification manager output for receiving the user identifiers of the two resource providers, the display manager for providing at an output coupled to the network, to at least one of the plurality of second computer systems, an indication of at least one of the two resource providers for which the potential mutual correspondence was identified to the other of the two resource providers, responsive to the user identifiers received at the display manager input.

In one embodiment, the potential mutual correspondence has an expiration date and time, and the display manager provides the indication with an indication of the expiration date and time.

In one embodiment, at least one of the actions is a selection of one of the plurality of resource providers user from results of a search.

In one embodiment, at least one of the actions is a request or a response to a request to indicate a relationship with one of the plurality of resource providers.

In one embodiment, at least one of the actions is a sending of a message to one of the plurality of resource providers.

In one embodiment, at least one of the actions is an indication that a previously identified potential mutual correspondence between one of the two resource providers and one of the plurality of users was or was not of interest to the at least one of the two users.

In one embodiment, the system additionally includes a general desirability manager having an input coupled for receiving from each of at least some of the plurality of resource providers a user identifier of that resource provider an indication of interest in at least one other of the plurality of resource providers and for each of indication of interest, the user identifier of said other resource provider, the general desirability manager for identifying for each other of the plurality of resource providers a general desirability score responsive to the indication of interests in that other resource provider received at the general desirability manager input and for providing the general desirability score at an output, and the identification manager input is additionally coupled to the general desirability manager output for receiving the general desirability scores, and the identification manager identifies the potential mutual correspondence additionally responsive to the general desirability scores.

In one embodiment, the interest is indicated responsive to one of the at least one of the two resource providers being identified as part of prior potential mutual correspondence between such resource provider and each of at least some of the plurality of resource providers identified before the identification of the potential mutual correspondence.

Described is a computer program product comprising a computer useable medium having computer readable program code embodied therein for identifying and providing a potential mutual correspondence of resources offered and interests in resource between two of a plurality of resource providers offering their resources over a network and displaying the potential mutual correspondence to at least one of the resource providers via the network, the computer program product comprising computer readable program code devices configured to cause a computer system to receive at a first computer system coupled to the network, via a plurality of second computer systems coupled to the network, characteristics about the resources being provided by each of the plurality of resource providers, receive at the first computer system via the plurality of second computer systems via the network from each of the plurality of resource providers, explicit preference information for characteristics of the resources desired by said resource provider, receive at the first computer system a plurality of indications of actions taken by each of the plurality of resource providers regarding individual other resource providers, the actions having been taken for purposes other than providing preference information for characteristics of the resources desired by said resource provider, identify at the first computer system the potential mutual correspondence between the two resource providers responsive to the characteristics of the two resource providers, the explicit preference information received from the two resource providers and at least one other of the plurality of resource providers and at least some of the indications of actions of the two resource providers and at least one other of the plurality of resource providers, and provide from the first computer system to at least one of the plurality of second computer systems, an indication of at least one of the two resource providers for which the potential mutual correspondence was identified to the other of the two resource providers, responsive to the computer readable program code devices configured to cause the computer system to identify.

In one embodiment, the potential mutual correspondence has an expiration date and time, and there are also comprising computer readable program code devices configured to cause the computer system to display an indication of the expiration date and time.

In one embodiment, at least one of the actions action is a selection of one of the plurality of resource providers user from results of a search.

In one embodiment, at least one of the actions is a request or a response to a request to indicate a relationship with one of the plurality of resource providers.

In one embodiment, at least one of the actions is a sending of a message to one of the plurality of resource providers.

In one embodiment, at least one of the actions is an indication that a previously identified potential mutual correspondence between one of the two resource providers and one of the plurality of users was or was not of interest to the at least one of the two users.

In one embodiment, the computer readable program code devices configured to cause the computer system to identify are additionally responsive to a number of the plurality of resource providers who have indicated an interest in at least one of the two resource providers.

In one embodiment, the interest is indicated responsive to one of the at least one of the two resource providers being identified as part of a prior potential mutual correspondence between such resource provider and each of at least one of the other of the plurality of resource providers identified prior to the computer readable program code devices configured to cause the computer system to identify.

What is claimed is:

1. A method of identifying and providing a potential mutual correspondence of resources offered and interests in resource between two different resource providers of a plurality of resource providers offering their resources over a network and displaying the potential mutual correspondence to at least one of the resource providers via the network, the method comprising:

receiving at a first computer system coupled to the network, via a plurality of second computer systems coupled to the network, characteristics about the resources being provided by each of the plurality of resource providers;

receiving at the first computer system via the plurality of second computer systems via the network from each of the plurality of resource providers, explicit preference information for characteristics of the resources desired by said resource provider;

receiving at the first computer system a plurality of indications of actions taken by each of the plurality of resource providers regarding individual other resource providers, the actions having been taken for purposes other than providing preference information for characteristics of the resources desired by said resource provider;

identifying at the first computer system the potential mutual correspondence between the two different resource providers responsive to the characteristics of the two different resource providers, the explicit preference information received from the two different resource providers and at least one other of the plurality of resource providers and at least some of the indications of actions of at least some of the plurality of resource providers taken towards at least one of the two different resource providers; and providing from the first computer system to at least one of the plurality of second computer systems, an indication of at least one of the two different resource providers for which the potential mutual correspondence was identified to the other of the two different resource providers, responsive to the identifying step.

2. The method of claim 1, wherein at least some of the actions of at least some of the plurality of resource providers taken towards at least one of the two different resource providers comprise viewing one of said at least one of the two different resource providers.

3. The method of claim 1, wherein at least some of the actions of at least some of the plurality of resource providers taken towards at least one of the two different resource providers comprise rejecting said at least one of the two different resource providers.

4. The method of claim 1, wherein at least some of the actions of at least some of the plurality of resource providers taken towards at least one of the two different resource providers comprise arranging a date with one of said at least one of the two different resource providers.

5. The method of claim 1, wherein at least some of the actions of at least some of the plurality of resource providers taken towards at least one of the two different resource providers comprise rejecting at least one of the two different resource providers.

6. The method of claim 1, wherein the potential mutual correspondence is identified additionally responsive to a date on which the actions were taken.

7. The method of claim 1:

additionally comprising receiving, before the characteristics are received, earlier characteristics that differ from the characteristics received, from each of at least one of the two different resource providers; and wherein the identifying the potential mutual correspondence excludes indications of actions taken towards the at least one of the two different resource providers from which the earlier characteristics were received, after the earlier characteristics are received and before the characteristics are received.

8. A system for identifying and providing a potential mutual correspondence of resources offered and interests in the resources between two different resource providers of a plurality of resource providers offering their resources over a network and displaying the potential mutual correspondence to at least one of the resource providers via the network, the system comprising:

a registration/preference/characteristic manager at a first computer system comprising a hardware processor system coupled to a memory system and having an input coupled to a network for receiving via a plurality of second computer systems coupled to the network, user identifiers and characteristics about the resources being provided by each of the plurality of resource providers and explicit preference information for the characteristics of the resources desired by said resource provider, the registration/preference/characteristic manager for providing at an output for each of the plurality of resource providers, the user identifier of said resource provider, the characteristics received from such resource provider, and the explicit preference information received from said resource provider at the registration/preference/characteristic manager input;

an other action manager at the first computer system comprising the hardware processor system coupled to the memory system and having an input coupled for receiving at the first computer system a plurality of indications of actions taken by each of the plurality of resource providers regarding individual other resource providers, comprising the user identifier of the resource provider taking the action and the user identifier of said individual other resource provider, the actions having been taken for purposes other than providing preference information for characteristics of the resources desired by said resource provider, the other action manager for providing at an output, for each action, the user identifier of each resource provider, an identifier of the action and the user identifier of the other resource provider;

an identification manager at the first computer system comprising the hardware processor system coupled to the memory system and having an input coupled to the registration/preference/characteristic manager output for receiving at least some of the user identifiers, the characteristics, and the explicit preference information, and to the other action manager output for receiving at least some of the user identifiers, identifiers of the actions and the user identifiers of the other resource providers, the identification manager for identifying the potential mutual correspondence between the two different resource providers responsive to the characteristics of the two different resource providers, the explicit preference information received from the two different resource providers and at least one other of the plurality of resource providers and at least some of the identifiers of the actions of at least some of the plurality of resource providers taken towards at least one of the two different resource providers, and providing the user identifiers of the two different resource providers at an output; and a display manager at the first computer system comprising the hardware processor system coupled to the memory system and having an input coupled to the identification manager output for receiving the user identifiers of the two different resource providers, the display manager for providing at an output coupled to the network, to at least one of the plurality of second computer systems, an indication of at least one of the two different resource providers for which the potential mutual correspondence was identified to the other of the two different resource providers, responsive to the user identifiers received at the display manager input.

9. The system of claim 8, wherein at least some of the actions of at least some of the plurality of resource providers taken towards at least one of the two different resource providers comprise viewing one of said at least one of the two different resource providers.

10. The system of claim 8, wherein at least some of the actions of at least some of the plurality of resource providers taken towards at least one of the two different resource providers comprise rejecting said at least one of the two different resource providers.

11. The system of claim 8, wherein at least some of the actions of at least some of the plurality of resource providers taken towards at least one of the two different resource providers comprise arranging a date with one of said at least one of the two different resource providers.

12. The system of claim 8, wherein at least some of the actions of at least some of the plurality of resource providers taken towards at least one of the two different resource providers comprise rejecting at least one of the two different resource providers.

13. The system of claim 8, wherein:
the other action manager additionally provides at the other action manager output a date on which each action was performed;
the identification manager input is additionally for receiving the date on which each action was performed; and
the identification manager identifies the potential mutual correspondence additionally responsive to the date on which the actions were taken.

14. The system of claim 8, wherein:
the other action manager additionally provides at the other action manager output a date on which each action was performed;
the identification manager input is additionally for receiving the date on which each action was performed;
the registration/preference/characteristic manager input is additionally for receiving, before the characteristics are received, earlier characteristics that differ from the characteristics received, from each of at least one of the two different resource providers;
the registration/preference/characteristic manager additionally provides at the registration/preference/characteristic manager output the earlier characteristics, at least one date the earlier characteristics were received and the dates the characteristics were received;
the identification manager input is additionally for receiving the earlier characteristics, the at least one date the earlier characteristics were received and dates the characteristics were received; and
the identification manager identifies the potential mutual correspondence by at least reducing an effect of indications of actions taken towards the at least one of the two different resource providers from which the earlier characteristics were received, after the date the earlier characteristics are received and before the dates the characteristics are received.

15. A computer program product comprising a non-transitory computer useable medium having computer readable program code embodied therein for identifying and providing a potential mutual correspondence of resources offered and interests in resource between two different resource providers of a plurality of resource providers offering their resources over a network and displaying the potential mutual correspondence to at least one of the resource providers via the network, the computer program product comprising computer readable program code devices configured to cause a computer system to:
receive at a first computer system coupled to the network, via a plurality of second computer systems coupled to the network, characteristics about the resources being provided by each of the plurality of resource providers;
receive at the first computer system via the plurality of second computer systems via the network from each of the plurality of resource providers, explicit preference information for characteristics of the resources desired by said resource provider;

receive at the first computer system a plurality of indications of actions taken by each of the plurality of resource providers regarding individual other resource providers, the actions having been taken for purposes other than providing preference information for characteristics of the resources desired by said resource provider;

identify at the first computer system the potential mutual correspondence between the two different resource providers responsive to the characteristics of the two different resource providers, the explicit preference information received from the two different resource providers and at least one other of the plurality of resource providers and at least some of the indications of actions of at least some of the plurality of resource providers taken towards at least one of the two different resource providers; and provide from the first computer system to at least one of the plurality of second computer systems, an indication of at least one of the two different resource providers for which the potential mutual correspondence was identified to the other of the two different resource providers, responsive to the computer readable program code devices configured to cause the computer system to identify.

16. The computer program product of claim 15, wherein at least some of the actions of at least some of the plurality of resource providers taken towards at least one of the two different resource providers comprise viewing one of said at least one of the two different resource providers.

17. The computer program product of claim 15, wherein at least some of the actions of at least some of the plurality of resource providers taken towards at least one of the two different resource providers comprise rejecting said at least one of the two different resource providers.

18. The computer program product of claim 15, wherein at least some of the actions of at least some of the plurality of resource providers taken towards at least one of the two different resource providers comprise arranging a date with one of said at least one of the two different resource providers.

19. The computer program product of claim 15, wherein at least some of the actions of at least some of the plurality of resource providers taken towards at least one of the two different resource providers comprise rejecting at least one of the two different resource providers.

20. The computer program product of claim 15, wherein the potential mutual correspondence is identified additionally responsive to a date on which the actions were taken.

21. The computer program product of claim 15:
additionally comprising computer readable program code devices configured to cause the computer system to receive, before the characteristics are received, earlier characteristics that differ from the characteristics received, from each of at least one of the two different resource providers; and wherein the computer readable program code devices configured to cause a computer system to identify the potential mutual correspondence exclude indications of actions taken towards the at least one of the two different resource providers from which the earlier characteristics were received, after the earlier characteristics are received and before the characteristics are received.

* * * * *